Figure 1:
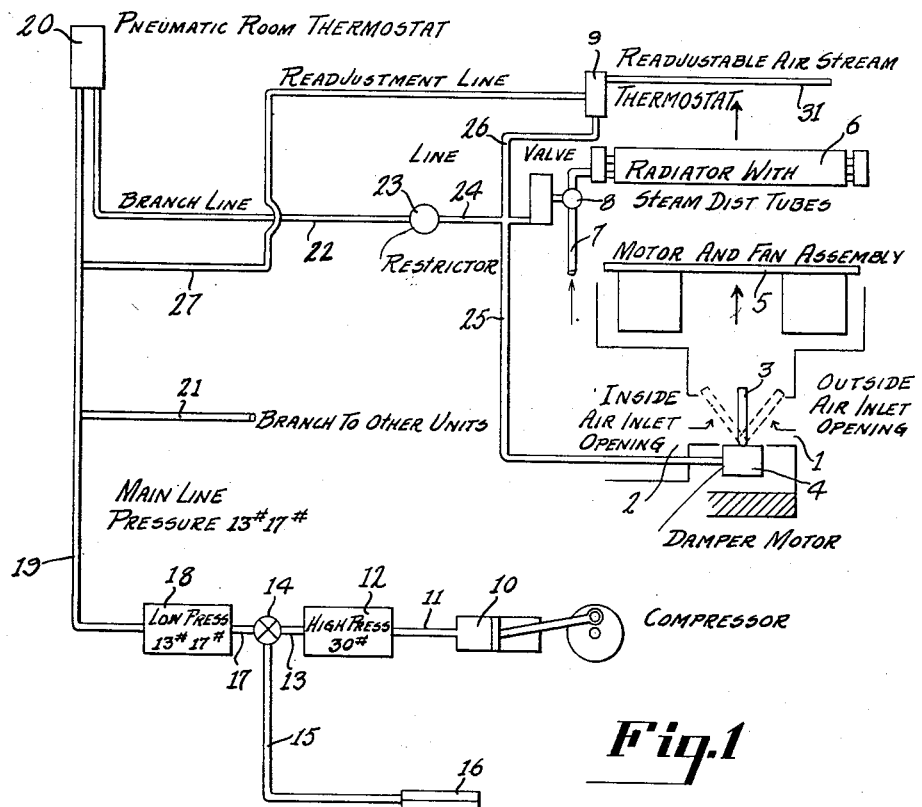

Oct. 1, 1940. J. McELGIN 2,216,350
APPARATUS FOR REMOTE AUTOMATIC READJUSTABLE
AIR STREAM CONTROL FOR UNIT VENTILATORS
Filed May 22, 1937

INVENTOR.
JOHN McELGIN
BY Toulmin & Toulmin
ATTORNEYS

Patented Oct. 1, 1940

2,216,350

UNITED STATES PATENT OFFICE 2,216,350

APPARATUS FOR REMOTE AUTOMATIC RE-ADJUSTABLE AIR STREAM CONTROL FOR UNIT VENTILATORS

John McElgin, Philadelphia, Pa., assignor to John J. Nesbitt, Inc., Philadelphia, Pa., a corporation of Pennsylvania Application May 22, 1937, Serial No. 144,216

3 Claims. (Cl. 236—91)

This invention relates to air conditioning.

It is an object of this invention to provide control means for ventilating and/or air conditioning units.

It is a further object of this invention to provide simple means for obtaining remote automatic readjustment of low limit pneumatic air stream thermostat means as applied to such units.

It is a further object of this invention to provide a single air stream temperature control means for such units and means for automatically readjusting the control point upwardly, as the outside temperature is reduced.

It is a further object of this invention to provide, in an air conditioning means, an air stream thermostat adapted to be disposed in the air stream of a ventilating and/or air conditioning unit and which is provided with connections for regulating the supply of heat to the air conditioning or tempering means of the unit and also for controlling the air inlet damper means of the unit.

It is a further object of this invention to provide such a thermostat in combination with means responsive to decrease in temperature of the outside air automatically to readjust the control point of the thermostat upwardly.

It is a further object of this invention to provide a method for controlling a plurality of air conditioning units from a single point remote therefrom.

It is a further object of this invention to provide a method for controlling and readjusting the control points of the air stream control thermostat of a plurality of air conditioning units by air pressure which is varied in accordance with changes in the outside temperature.

It is a further object of this invention to provide an extremely simple, efficient, inexpensive and trouble-free readjustable air stream thermostat structure.

These and other objects and advantages will appear from the following description taken in connection with the drawing.

Figure 2:
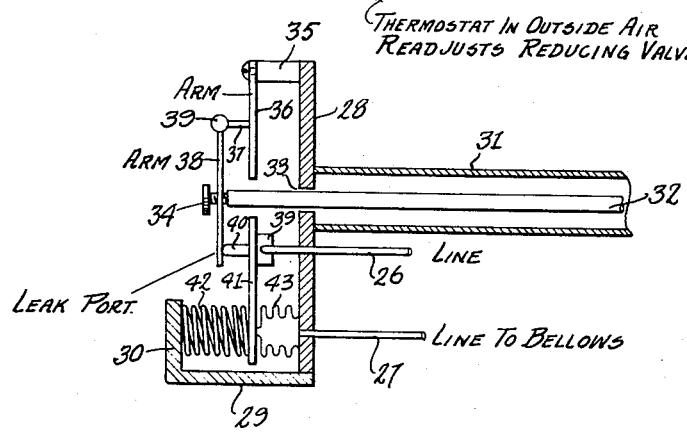

In the drawing:

Figure 1 is a diagrammatic view of the application of the structure of this invention, as applied to a single unit of an air conditioning system; and Figure 2 is an elevational view, partly in section, of a preferred form of readjustable air stream control thermostat constructed according to the principles of this invention.

Referring to the drawing in detail and with reference particularly to Figure 1, the casing of the air conditioning unit is provided with an outside air inlet opening 1 and an inside or recirculated air inlet opening 2, which are controlled by means of the damper 3 having a suitable damper motor or engine 4 which is pressure responsive or provided with fluid pressure responsive control means. The motor and fan assembly 5 is disposed beyond the air inlet openings in the path of the air, and beyond the motor and fan assembly is the radiator 6 for heating or tempering the inlet air, which radiator 6 is preferably provided with steam distribution tubes. The radiator 6 is supplied with steam through the pipe 7 which is controlled by the fluid pressure responsive valve 8.

Disposed adjacent the outlet of the air conditioning unit in the path of air issuing therefrom is the readjustable air stream control thermostat 9, hereinafter also for conciseness termed the differential thermostat 9. This readjustable air stream control thermostat is adapted to control the fluid pressure responsive control valve 8 and also the damper motor or engine 4, whereby to control the supply of steam to the radiator 6 and also the damper 3.

The control medium utilized is fluid pressure which is preferably supplied by the compressor 10 which is connected by pipe 11 to the high pressure tank 12. The high pressure tank 12 is connected by a pipe 13 with the pressure reducing valve 14 which is controlled by the thermostat 16 connected thereto by means of the pipe 15. The pressure reducing valve 14 is connected by pipe 17 to the low pressure tank 18. The main line 19 of the control system has one end connected to the low pressure tank 18 and the other end connected to the pneumatic room thermostat 20. A suitable branch 21 is provided for connection of the main line 19 to one or more other units. The pneumatic room thermostat 20 is connected by the branch line 22 to the restrictor 23. A pipe 24 leads from the restrictor 23 to the fluid pressure responsive control valve 8. The pipe 24 is connected by the pipe 25 to the damper motor or engine 4. The pipe 24 is also connected by the pipe 26 to the leak port of the readjustable air stream control thermostat 9. The main line 19 is also connected by the readjustment line 27 to the bellows of the readjustable air stream control thermostat 9.

The details of the readjustable air stream control thermostat are shown in Figure 2, and comprise a frame including a back plate 28 and a base plate 29 with a forward flange 30. Rigidly secured at one end to the back plate 28 of the frame is the sleeve or housing 31 in the form of an expansible metallic tube, preferably of brass, which extends for a substantial distance from the back plate and which is closed at its right end, as seen in Figure 1. The expansible tube 31 is adapted to be disposed in the path of the heated or tempered air issuing from the radiator 6.

Disposed centrally within the housing or tube 31 and having its right end (not shown) rigidly secured to the right end of the expansible tube 31 is the metal rod or thrust member 32 (preferably steel). The left end portion of the rod 32 extends through the bore 33 provided in the back plate 28 for that purpose. The left end of the rod 32 is adapted (under certain conditions) to engage an adjustment screw 34 which serves a purpose which will hereinafter more clearly appear.

Secured at the top of the back plate 28 is a forwardly projecting bracket 35 having a depending arm 36 provided with a forwardly directed projection 37 having the depending arm 38 pivotally secured at 39 thereto. The arm 38 has the adjusting screw 34 screw-threaded therethrough. At its lower end, the arm 38 is adapted for engagement with a leak port in the jet 40 which extends from the fluid box 39 which has the pipe 26 connected thereto. The fluid box and the jet 40 are rigidly secured to a plate 41 which is movable between the back plate 28 and flange 30 of the base plate 29. The plate 41 is normally urged toward the back plate 28 by the compression spring 42, and disposed between the plate 41 and the back plate 28 is a bellows member 43 having one end secured to the plate 41 and the other end secured to the back plate 28. The readjustment line 27 is connected to the interior of the bellows member 43.

As before stated, the fluid pressure responsive control valve 8 and the damper motor or engine are controlled by pressure in pipes 24, 25 and 26 and, due to their connection, the pressure in each of these pipes is always equal. The fluid pressure admitted through the restrictor 23 from the branch line 22 is controlled by the pneumatic room thermostat 20. However, the pressure in the main line 19 is controlled through the pressure reduction valve 14 by the thermostat 16 which is disposed in the outside air. This fluid pressure, in addition to being supplied to the pneumatic room thermostat 20, is also supplied through the readjustment line 27 to the bellows 43 of the readjustment control thermostat 9. The fluid pressure supplied to the bellows 43 normally urges the plate 41 and its supported jet 40 toward the left, as seen in Figure 2.

For a given setting of the control thermostat 9, the arm 38 will be engaged with the leak port in the jet 40, whereby to retain fluid pressure in the pipes 24, 25 and 26. Upon cooling and consequent contraction of the tube or sleeve 31, the rod or thrust member 32 will engage the adjustment screw 34 and upon further leftward movement of the rod 32, the arm 38 will be moved to the left away from engagement with the leak port in the jet 40, and fluid pressure will then escape from pipes 24, 25 and 26. Likewise, when pressure is increased in the main line 19 (through control of thermostat 16 upon increase of outside temperature), which is connected by the readjustment line 27 with the bellows 43, the pressure being increased in the bellows 43 will cause the plate 41 to be moved toward the left against the spring 42 to move the jet 40 and its leak port to the left and cause the engaged arm 38 to be brought away from the left end of the thrust member or rod 32. This will lower the operating point of the thermostat 9 because a greater contraction of the sleeve 31 will be required to cause fluid pressure to escape from pipes 24, 25 and 26. Thus the control of the fluid pressure in pipes 24, 25 and 26 is dependent upon the temperature of the expansible sleeve 31 and also upon the fluid pressure in the main line 19 which is connected by the readjustment line 27 with the bellows of the thermostat 9. The pressure in the pipes 24, 25 and 26 is also proportional to the pressure in the branch line 22 which is controlled by the room thermostat 20. The pressure in the main line 19 is controlled as above explained, by the thermostat 16 which is responsive to the temperature of the outside air.

It will thus be seen that, by means of the above-described structure, the control point of the single temperature air stream control thermostat 9 is automatically readjusted upwardly as the outside temperature, to which the thermostat 16 is responsive, is reduced. By means of the connection provided between the respective units by the branch line 21, the control points of the air stream control thermostats of other units of an air conditioning system may be controlled. The branch line 21 will be connected to any one or more air stream control thermostats in the same manner in which the readjustment line 27 is connected to the thermostat 9 shown.

In mild winter weather, the introduction of a proper quantity of air at, say, ten degrees below room temperature provides the required cooling power and yet is insufficiently cold to cause cold drafts. As the outside temperature decreases, there exists a lesser need for this cooling power, even though the room thermostat may, upon occasions, demand it. Furthermore, if the cooling rate is too rapid, complaints from drafts will result.

In a preferred adjustment of the structure illustrated a pressure of 17 pounds per square inch will be maintained in lines 19 and 27 and the bellows 43 will move the plate 41 and supported parts to the left; this will swing the arm 38 and its adjustment screw 34 to the left to require relatively great contraction of sleeve 31 to cause rod 32 to lift arm 38 from the leak port. In cold weather the pressure in lines 19 and 27 will be 13 pounds and the bellows permits the plate 41 to move to the right to raise the point at which the leak port is uncovered by raising of the arm 38.

By the above-described upward readjustment of the control points of the air stream control thermostat, the cooling power of the unit and of all the units of the system connected therewith is reduced and also the drooping effect of a wide differential air stream control is offset. This drooping characteristic results from the fact that a wide differential is necessary for air stream controls to prevent "hunting," that is, to prevent the system, when operating to reduce the temperature, from exceeding the desired reduction and, when increasing the temperature of air supply, from exceeding the desired temperature. Hence, as the temperature of air entering the system decreases, the load (for a constant control point) increases. To cause the steam valve to open further and increase the heat supplied to the air, the control point of the thermostat must naturally follow.

As shown in Figure 1, the thermostat 16, which is exposed to the outside air, automatically readjusts the pressure carried in the main line 19 from thirteen pounds in cold weather to seventeen pounds in the mildest weather. These values and the values hereinafter set forth are, of course, merely illustrative and in no wise limiting. This variation of pressure in the main line 19 will not seriously affect the operating point of the room thermostat 20. It has been found unnecessary, in an adequately sized system, to hold the pressure closer than one pound.

The pressure release mechanism of the readjustable air stream thermostat 9 operates to adjust the pressure in the pipes 24, 25 and 26 in response to temperature contraction of sleeve 31 and consequent leftward movement of the rod 32 and the pressure in the bellows, which is equal to that in the main line 19. This adjustment of pressure is accomplished by leakage of fluid pressure from the pipes 24, 25 and 26 through the leak port in the jet 40 of this thermostat. The connection of the readjustment line 27 to the bellows thus serves a purpose of resetting the control point of the readjustable control or differential thermostat 9, as the pressure in the main line 19, which is controlled by the thermostat 16, varies. The range over which the instrument is readjusted will preferably fall between 60 degrees and 75 degrees. Thus, in mild weather, a 60-degree low limit preferably prevails, while, in weather wherein the outside temperature is twenty degrees or more below, a 75-degree low limit would preferably be used. This readjustment need not be precise, as it is only necessary to readjust the control point of the air stream control thermostat or differential thermostat 9 upwardly as the outside temperature falls. The action of the differential thermostat, in reducing the pressure in the pipes 24, 25 and 26, does not begin until, in response to room or inside temperature, the pneumatic room thermostat 20 is made operative.

In the operation of the differential thermostat 9, as the pressure in the bellows 43 (which is equal to the pressure in the main line 19) increases due to increase in outside temperature, the plate 41 is moved out to the left, and this movement requires greater contraction of sleeve 31 and a consequently lower temperature to cause the rod 32 to lift the arm 38 from the port. The pressure in pipes 24, 25 and 26 is increased under these high outside temperature conditions and controls, through the pressure responsive valve 8, the supply of steam to the radiator 6 and also, through the damper motor or engine 4, the operation of the damper 3. In cold weather and 13 pounds in lines 19 and 27, the plate 41 moves to the right and the point at which the arm 38 uncovers the leak port is raised.

It will, of course, be understood that the above-described structure is merely illustrative of the manner in which the principles of the method of my invention may be utilized and that I desire to comprehend within my invention such modifications as come within the scope of the claims and the invention.

Having thus fully described my invention, what I claim as new and desire to secure by Letters Patent is:

1. In an air conditioning system, a casing having an outside air inlet and a recirculated air inlet, a damper for regulating the proportions of the outside air and recirculated air traversing said casing, a heat exchanger in said casing, a valve for regulating the supply of air conditioning fluid to said heat exchanger, a fluid pressure responsive damper engine for operating said damper, a fluid pressure operating circuit therebetween, a fluid pressure responsive air stream control thermostat disposed in the path of the stream of air traversing said casing and connected to said fluid pressure operating circuit for regulating the pressure therein, a room temperature responsive thermostat connected to said fluid pressure operating circuit, a fluid pressure control circuit connected to said room thermostat and to said air stream control thermostat for simultaneously controlling said valve and said engine, and means responsive to outside temperatures for varying the pressure in said fluid pressure control circuit.

2. In an air conditioning system, a casing having an outside air inlet and a recirculated air inlet, a damper for regulating the proportions of the outside air and recirculated air traversing said casing, a heat exchanger in said casing, a valve for regulating the supply of air conditioning fluid to said heat exchanger, a fluid pressure responsive motor for operating said supply valve, a fluid pressure responsive damper engine for operating said damper, a fluid pressure operating circuit therebetween, a fluid pressure responsive air stream control thermostat disposed in the path of the stream of air traversing said casing and connected to said fluid pressure circuit for regulating the pressure therein, a room temperature responsive thermostat connected to said fluid pressure operating circuit, a fluid pressure control circuit connected to said room thermostat and to said air stream control thermostat for simultaneously controlling said valve and said engine, means for varying the pressure in said fluid pressure control circuit comprising a source of fluid pressure, a pressure reduction valve connecting said source to said fluid pressure control circuit, and an outside temperature responsive control thermostat for controlling the fluid pressure in said fluid pressure control circuit.

3. In an air conditioning system, a casing having an outside air inlet and a recirculated air inlet, a damper for regulating the proportions of the outside air and recirculated air traversing said casing, a heat exchanger in said casing, a valve for regulating the supply of air conditioning fluid to said heat exchanger, a fluid pressure responsive damper engine for operating said damper, a fluid pressure operating circuit for said valve and damper engine, a fluid pressure responsive air stream control thermostat disposed in the path of the stream of air traversing said casing and connected to said fluid pressure operating circuit for regulating the pressure therein, a room temperature responsive thermostat connected to said fluid pressure operating circuit, a fluid pressure control circuit connected to said room thermostat and to said air stream control thermostat for simultaneously controlling said valve and said engine, and means responsive to outside temperatures for varying the pressure in said fluid pressure control circuit, said last-mentioned means including a valve in said control circuit and controllable by an outdoor thermostat.

JOHN McELGIN.